(12) United States Patent
Hoeller et al.

(10) Patent No.: US 10,254,106 B2
(45) Date of Patent: Apr. 9, 2019

(54) METHOD AND OPTICAL SENSOR FOR DETERMINING AT LEAST ONE COORDINATE OF AT LEAST ONE MEASUREMENT OBJECT

(71) Applicant: Carl Zeiss Industrielle Messtechnik GmbH, Oberkochen (DE)

(72) Inventors: Frank Hoeller, Aalen (DE); Christian Hembd, Oberkochen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 15/844,616

(22) Filed: Dec. 17, 2017

(65) Prior Publication Data

US 2018/0172427 A1 Jun. 21, 2018

(30) Foreign Application Priority Data

Dec. 19, 2016 (DE) .................. 10 2016 225 484

(51) Int. Cl.
*G01B 11/00* (2006.01)
(52) U.S. Cl.
CPC .................. *G01B 11/002* (2013.01)
(58) Field of Classification Search
CPC . G02B 11/06; G02B 11/0032; G02B 11/0068; G01B 11/02; G01B 2210/50; H04N 13/02
See application file for complete search history.

(56) References Cited

U.S. PATENT DOCUMENTS

| 8,488,113 | B2 | 7/2013 | Thiel et al. |
| 9,025,245 | B2 * | 5/2015 | Chen ............... G02B 21/06 356/489 |
| 2003/0156323 | A1 | 8/2003 | Overbeck |
| 2004/0131244 | A1 | 7/2004 | Nehse et al. |
| 2008/0296263 | A1 * | 12/2008 | Alexander ........ B23K 26/0604 216/94 |

(Continued)

FOREIGN PATENT DOCUMENTS

DE 102008017481 A1 10/2009
DE 102008018143 A1 10/2009

(Continued)

*Primary Examiner* — Sang H Nguyen
(74) *Attorney, Agent, or Firm* — Ewers & Hasselmann PLLC

(57) ABSTRACT

An optical sensor for determining a coordinate of a measurement object is provided which includes a stop element and an illumination apparatus configured to generate an illumination light beam and to illuminate the measurement object through the stop element, a sensor element configured to detect a portion of a detection light beam emanating from the measurement object and to determine an intensity distribution, and an optical element configured to focus a portion of the illumination light beam at one focal point along an optical axis. The optical sensor includes an apparatus configured to vary and set a relative lateral position of the optical axis to the measurement object to determine, for each of first and second focal points, first and second intensity distributions at first and second relative lateral positions and to determine therefrom a distance coordinate and/or a lateral coordinate of the measurement object.

14 Claims, 1 Drawing Sheet

(56) References Cited

U.S. PATENT DOCUMENTS

| | | | |
|---|---|---|---|
| 2009/0059208 A1* | 3/2009 | Steffens | G01B 9/04 356/73 |
| 2010/0188472 A1 | 7/2010 | Sirton et al. | |
| 2012/0075425 A1* | 3/2012 | Thiel | A61B 5/0068 348/46 |
| 2013/0162806 A1 | 6/2013 | Ding et al. | |
| 2014/0043470 A1* | 2/2014 | Winterot | G02B 9/34 348/135 |
| 2014/0046628 A1 | 2/2014 | Ligneul et al. | |
| 2015/0055215 A1* | 2/2015 | Chen | G02B 21/0064 359/386 |

FOREIGN PATENT DOCUMENTS

| | | |
|---|---|---|
| JP | 2007248208 A | 9/2007 |
| KR | 100964251 B1 | 6/2010 |
| WO | 2015180755 A1 | 12/2015 |

* cited by examiner

METHOD AND OPTICAL SENSOR FOR DETERMINING AT LEAST ONE COORDINATE OF AT LEAST ONE MEASUREMENT OBJECT

CROSS REFERENCE TO RELATED APPLICATIONS

This application claims priority to German patent application DE 10 2016 225 484.7, filed Dec. 19, 2016, the entire content of which is incorporated herein by reference.

TECHNICAL FIELD

The invention relates to an optical sensor and a method for determining at least one coordinate of at least one measurement object. The present invention relates in particular to the field of coordinate measuring technology using a non-contact coordinate measuring apparatus.

BACKGROUND

Various apparatuses and methods for determining coordinates of measurement objects, for example turbine blades, vehicle body sheets, seals or printed circuit boards, are known from the related art. In particular, the determination of an orientation of edges of the measurement object is important, for example, because reference coordinate systems that are employed are frequently defined in relation to edges.

For measuring edges, for example, imaging methods are known in which the focus is traversed in increments ("infinite focus") and the orientation of the edges is determined by way of edge detection. However, such methods may require a long measurement time.

Also known are confocal and confocally chromatic distance sensors. In sensors of this type, depth determination is performed by evaluating an intensity distribution along a height coordinate z. By way of example, confocally chromatic sensors permit measurement of the height coordinate z with a single image. In principle, in the case of such sensors, use is made of measurement objective lenses having chromatic aberration, which focus portions of a light beam with different wavelengths in different focal planes along an optical axis of the sensor. Each wavelength of the light beam can thus be assigned a height coordinate. If a focus of a wavelength is located on a surface of the measurement object, an intensity maximum can be measured for the wavelength on a sensor element of the confocally chromatic sensor and the depth can thus be determined.

When using confocally chromatic sensors for non-contact measurement of a three-dimensional measurement object, measurement artefacts can occur at edges that make exact localization of the edge difficult. In confocally chromatic sensors, a longitudinal chromatic aberration is introduced, which can have the effect that light is reflected and/or scattered by the measurement object and detected by a sensor even if the edge is not located on an optical axis of the confocally chromatic sensor and/or the edge no longer shadows the optical axis. The sensor can detect, for example, light having a shorter or longer wavelength as compared to a confocal wavelength with a longitudinal chromatic aberration. For these non-confocal wavelengths, it is also possible for a spectral peak to be determined by the confocally chromatic sensor even if the optical axis is no longer covered by the edge. In addition, a height coordinate which is thus determined can deviate from an actual height coordinate.

SUMMARY

It is an object of the present invention to provide an optical sensor and a method which at least largely avoid the disadvantages of the known apparatuses and methods. In particular, the measurement of at least one edge of the measurement object is intended to be made possible.

Hereinafter the terms "exhibit", "have", "comprise" or "include" or any grammatical deviations therefrom are used in a non-exclusive way. Accordingly, these terms can refer either to situations in which, besides the feature introduced by these terms, no further features are present, or to situations in which one or more further features are present. For example, the expression "A exhibits B", "A has B", "A comprises B" or "A includes B" may refer both to the situation in which no further element aside from B is provided in A (that is to say to a situation in which A is composed exclusively of B) and to the situation in which, in addition to B, one or more further elements are provided in A, for example element C, elements C and D, or even further elements.

Furthermore, it is pointed out that the terms "at least one" and "one or more" and grammatical modifications of these terms or similar terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Furthermore, hereinafter the terms "preferably," "in particular," "by way of example," or similar terms are used in conjunction with optional features, without alternative embodiments thereby being restricted. In this regard, features introduced by these terms are optional features, and there is no intention to restrict the scope of protection of the claims, and in particular of the independent claims, by these features. The invention, as will be recognized by a person skilled in the art, can also be carried out using other configurations. Similarly, features introduced by "in one embodiment of the invention" or by "in one exemplary embodiment of the invention" are understood as optional features, without alternative configurations or the scope of protection of the independent claims thereby being intended to be restricted. Furthermore, all possibilities of combining the features introduced by these introductory expressions with other features, whether optional or non-optional features, are intended to remain unaffected by said introductory expressions.

According to a first aspect of the present invention, an optical sensor for determining at least one coordinate of at least one measurement object is provided. In this case, a measurement object can generally be understood in the context of the present invention to mean an arbitrarily shaped object to be measured. By way of example, the measurement object can be selected from the group consisting of a test specimen, a workpiece to be measured and a component to be measured, for example a motor vehicle. The measurement object can be a three-dimensional measurement object, for example at least one turbine blade, at least one vehicle body sheet, at least one seal or at least one printed circuit board. In particular, the measurement object can be at least one edge or have at least one edge. An edge in the context of the present invention can be understood to mean a surface having a delimitation or a contour having a radius of curvature of less than 1 mm. Other measurement objects are also conceivable. In particular, the measurement object can be a planar measurement object, for example having an extensive surface. The surface can be at least partly reflective. Partly reflective can be understood to mean that the surface of the measurement object is configured to specularly reflect and/or to return at least one portion of an illumination light beam.

An optical sensor can in principle be understood to mean any optical sensor that is configured to determine at least one coordinate, in particular a distance coordinate, of a measurement object. The optical sensor can be selected from the group consisting of a confocal sensor and a chromatically confocal sensor. The optical sensor can have at least one confocal and/or at least one confocally chromatic beam path. In the context of the present invention, the term "beam path" means a course of light beams through optical elements. In the context of the present invention, a "confocal beam path" is a beam path in which an illumination beam path and a detection beam path are confocal. In particular, a first focus can be located on a determination location on the surface of the measurement object and at the same time a second focus can be located at a point in a center of a stop element which is arranged upstream of a sensor element in a propagation direction of a light beam returned from the measurement object. In the context of the present invention, the expression "determination location" means a fundamentally arbitrary location, in particular a point or an area, on the surface to be measured of the measurement object at which a determination of a distance coordinate is carried out. By way of example, a determination location can be a measurement point on the surface of the measurement object. In the context of the present invention, a "chromatically confocal beam path" is a beam path in which an illumination beam path and a detection beam path are confocal for at least one wavelength of the illumination light beam. In particular, for at least one wavelength of the illumination light beam, the condition can be met that a first focus is located on the determination location on the surface of the measurement object and at the same time a second focus is located at a point in a center of a stop element which is arranged upstream of a sensor element in a propagation direction of a light beam returned from the measurement object. The optical sensor can be configured to measure a measurement object, in particular a surface and/or a surface contour of a measurement object. In particular, the optical sensor can be a non-contact distance sensor in the field of coordinate measuring technology or can be used in a non-contact distance sensor. The optical sensor can be configured to measure an extensive, in particular non-punctiform, surface of the measurement object.

In the context of the present invention, coordinates of a measurement object are coordinates on the surface to be measured, in particular of edges, of the measurement object, in particular distance coordinates. One or more coordinate systems can be used for this purpose. By way of example, a Cartesian coordinate system or a spherical coordinate system can be used. Other coordinate systems are also conceivable. The optical sensor can have an optical axis in the viewing direction of a sensor element. The optical axis can be an axis of the coordinate system, for example the z-axis. A distance coordinate is a coordinate along the z-axis. Further axes, for example x-axis and y-axis, can be provided perpendicular to the z-axis. A determination of a distance coordinate means, in particular, a determination of a distance between the respective determination location of the measurement object and the optical sensor, for example a distance between the respective determination location of the measurement object and at least one element of the optical sensor, in particular the sensor element and/or at least one confocal stop element.

The optical sensor comprises:
at least one first stop element and at least one illumination apparatus which is configured to generate at least one illumination light beam and to illuminate the measurement object through the first stop element;
at least one sensor element which is configured to detect at least one portion of at least one detection light beam emanating from the measurement object and to determine at least one intensity distribution;
at least one optical element which is configured to focus at least one portion of the illumination light beam at least at one focal point along an optical axis of the optical element, wherein the optical sensor is configured to set at least one first focal point and at least one second focal point along the optical axis;
at least one apparatus for varying a relative lateral position, which is configured to set at least one relative lateral position of the optical axis to the measurement object.

In the context of the present invention, a "stop element" is, in principle, an optical element or component of the confocally chromatic sensor which is configured to delimit an extent of a beam of rays. The designation "first" stop element should be understood as a pure designation and in particular provides no information about an order or whether the optical sensor has further stop elements. The first stop element can be arranged in front of the illumination apparatus. The optical sensor can have at least one confocal stop element which is configured to permit passage of the at least one portion of the detection light beam to the sensor element. The first stop element and the confocal stop element can each have at least one hole element. A "confocal stop element" is a fundamentally arbitrary stop element which is arranged in a focal plane of the optical element upstream of the sensor and which is configured to block out defocused portions of the detection light beam, in particular strongly defocused portions, and to allow focused portions to pass through. An arrangement, in particular a position, of the confocal stop element can be dependent on the measurement object, a quantity of light, and a desired resolution. In the context of the present invention, a hole element is a fundamentally arbitrarily shaped opening. The first stop element and the confocal stop element can be configured as optical elements having at least two arbitrarily shaped and/or settable and/or adjustable openings. The first stop element and/or the confocal stop element can have a multiplicity of hole elements, for example a hole grid comprising a plurality of holes. The first stop element and the confocal stop element can have, for example, dot-shaped or slit-shaped hole elements.

The hole element of the first stop element and the hole element of the confocal stop element can have different sizes, for example different diameters. For example, the hole element of the confocal stop element can be increased in terms of size as compared to the hole element of the first stop element such that even defocused portions of the detection light beam are allowed to pass through the confocal stop element. The optical sensor, for example, may not have a confocal stop element. By way of example, the hole element of the confocal stop element can be configured to allow the detection light beam to pass through to the sensor element without being influenced. This can be advantageous both for reflective surfaces and for matt surfaces, because luminous flux to the sensor element is increased. In an exemplary embodiment, the optical sensor can have a multispot sensor. The optical sensor can be configured to change the size of the at least one hole element of the confocal stop element.

In the context of the present invention, an illumination apparatus is any apparatus which is configured to generate at least one light beam. The illumination apparatus can have at least one light source. The illumination apparatus can have at least one light source selected from the group consisting of at least one monochromatic light source, at least one polychromatic light source, at least one white light source, and at least one broadband light source. The light source can have a wide and uniformly distributed spectral density. In the context of the present invention, "to illuminate the measurement object through" means that the illumination apparatus is configured to illuminate the first stop element and furthermore to illuminate the surface, in particular a point or an area on the surface, of the measurement object. The illumination apparatus can furthermore have at least one further optical element, in particular a lens element, which is configured to focus the light beam generated by the light source.

In the context of the present invention, "light" is electromagnetic radiation in at least one spectral range selected from the visible spectral range, the ultraviolet spectral range and the infrared spectral range. The term visible spectral range encompasses, in principle, the range of 380 nm to 780 nm. The term infrared (IR) spectral range encompasses, in principle, the range of 780 nm to 1000 µm, wherein the range of 780 nm to 1.4 µm is designated as near infrared (NIR), and the range of 15 µm to 1000 µm is designated as far infrared (FIR). The term ultraviolet encompasses, in principle, the spectral range of 100 nm to 380 nm. Visible light, i.e., light from the visible spectral range, is preferably used in the context of the present invention. The term "light beam" is, in principle, a quantity of light which is emitted and/or radiated in a specific direction. The light beam can be a beam of rays. The term "illumination light beam" means a light beam which is generated by the illumination apparatus and illuminates the measurement object, in particular the surface of the measurement object. "At least one detection light beam emanating from the measurement object" is a light beam which is returned from the measurement object, in particular from the surface of the measurement object and which is detectable by the sensor element. The detection light beam can have a propagation direction, such that the detection light beam illuminates the sensor element.

In the context of the present invention, a "sensor element" is an arbitrary apparatus which is configured to capture at least one optical measurement variable, for example an intensity, of the detection light beam and to generate a corresponding signal, for example an electrical signal, for example an analog and/or a digital signal. The sensor element can be a spectrally resolving detector and/or comprise a spectrally resolving detector. In particular, the sensor element can be or comprise a spectrometer. An intensity distribution in the context of the present invention is an intensity profile and/or a dependence of the intensity on the wavelength.

The optical sensor comprises at least one optical element which is configured to focus at least one portion of the illumination light beam at at least one focal point along the optical axis of the optical element. "Focal point," also referred to as focus point or focus, in the context of the present invention means a point and/or region in a focal plane, also referred to as focus plane, perpendicular to the optical axis, in which light beams that are incident on the optical element parallel to the optical axis intersect.

The optical sensor is configured to set the at least one first focal point and the at least one second focal point, in particular a z-coordinate of the focal point, along the optical axis. "Setting" of the first and second focal point in the context of the present invention means arranging and/or changing and/or displacing the z-coordinate of one or both focal points. For example, the optical element can be a lens element having a settable and/or adjustable focal length, and the focal points can be set by setting the focal length. For example, the focal points can be set by way of displacing the optical element along the z-axis. For example, when using a monochromatic light source, the illumination light beam can be focused in a first focal plane and, in particular subsequently, one or both of the focal length of the lens element or an arrangement of the optical element can be changed such that the illumination light beam is focused in a second focal plane. The optical element can, for example, be an optical element having chromatic aberration. The optical element can be configured to focus a multiplicity of portions of the illumination light beam depending on the wavelength at a multiplicity of different focal planes along the optical axis. The optical sensor can be configured to focus portions of an illumination light beam having different wavelengths in focal planes along an optical axis. By way of example, a first portion of the illumination light beam having a first wavelength can be focused in a first focal plane, for example at a first point, in particular a first z-coordinate, and a second portion of the illumination light beam having a second wavelength, which is different from the first wavelength, can be focused in a second focal plane, for example a second point, in particular a second z-coordinate, which is different from the first point.

In the context of the present invention, an optical element is an arbitrary optical structural part or an arbitrary optical component. The optical element can comprise a lens element and/or a compound lens. The optical element can be an optical element having chromatic aberration. The optical sensor can have at least one transfer apparatus. The transfer apparatus can be configured as part of the optical element or as a separate element. The transfer apparatus can be configured to guide and/or to direct light generated by the illumination apparatus onto the measurement object, in particular onto the surface of the measurement object. Furthermore, the transfer apparatus can be configured to guide and/or to direct light returned and/or reflected from the measurement object onto the confocal stop element. The transfer apparatus can be selected from the group consisting of at least one beam splitter, at least one lens element, and at least one compound lens.

"Lateral position" is a position in the focal plane, in particular along the x-axis. "Relative lateral position" is a relative lateral position of the measurement object to the optical sensor, in particular to the optical axis. "Setting the relative lateral position" in the context of the present invention can be understood to mean arranging the measurement object and/or the optical sensor and/or changing the relative lateral position. Setting can be performed manually and/or automatically, for example using at least one motor. "An apparatus for varying a relative lateral position" is an apparatus which is configured to set the relative lateral position of the optical axis to the measurement object. The apparatus for varying a relative lateral position can have at least one displacement device which is configured to set a lateral position of the measurement object and/or a lateral position of the optical sensor, in particular of the optical element. The displacement device can have, for example, at least one measurement table on which the measurement object can be arranged, and which is configured to change the lateral position of the measurement object. The measurement object can be arranged, for example, on the measurement table at a working height and can be moved, in particular lifted or lowered, via a lifting apparatus in the focal plane, in particular along the x-axis. The measurement table can be configured to move the measurement object in the x-, y-, and z-direction and to set a three-dimensional position of the measurement object. Alternatively, or additionally, the displacement device can be configured to move the optical sensor in the x-, y-, and z-direction, i.e., along the x-, y-, and z-axes, and to set a three-dimensional position of the measurement object. The displacement device can have at least one movable holder that is configured to position the optical sensor. The movable holder can have at least one guide and/or a joint which are configured to move the optical sensor in the x-, y-, and z-direction. The displacement device can have a movable portal. The displacement device can have at least one movable arm, for example an articulated arm. Alternatively, or additionally, the apparatus for varying a relative lateral position can have at least one beam deflection apparatus, which is configured to deflect the illumination light beam from the optical axis. The beam deflection apparatus can have an apparatus selected from the group consisting of at least one deflection mirror, at least one micro-electro-mechanical systems (MEMS) mirror, at least one decentralizable lens element, and at least one rotating prism.

The apparatus for varying the relative lateral position can be configured to set the relative lateral position continuously or non-continuously, in particular incrementally. For example, the apparatus for varying the relative lateral position can be configured to continuously change the measurement object and/or the optical sensor. The apparatus for varying the relative lateral position can be configured to set at least one first relative lateral position and at least one second relative lateral position. The first and second relative lateral positions can be neighboring relative lateral positions. The first and the second relative lateral position can be arranged such that a gradient of the intensity can be determined. The apparatus for varying the relative lateral position can be configured to set a multiplicity of relative lateral positions, for example an array of relative lateral positions. The apparatus for varying the relative lateral position can be configured to set at least two relative lateral positions successively or at the same time. The optical sensor can be configured to determine the at least one intensity distribution at a multiplicity of relative lateral positions, in particular at each of the relative lateral positions of the array of relative lateral positions. The optical sensor can be configured to determine in each case an intensity distribution at neighboring relative lateral positions. By way of example, determination of the intensity distributions at the relative lateral positions of the array can be provided in parallel fashion and/or at the same time. The optical sensor can have at least one multispot sensor.

The optical sensor is configured to determine, for at least one first focal point and at least one second focal point, in each case at least one first intensity distribution at the at least one first relative lateral position and at least one second intensity distribution at the at least one second relative lateral position. The focal points can be mutually different focal points. For example, the optical element can be a lens element with chromatic aberration, and it is possible to determine at the first relative lateral position the first intensity distribution and at the second lateral position the second intensity distribution having a first wavelength of the illumination light beam and a second wavelength of the illumination light beam. It is possible, for example, to determine at the first relative lateral position the first intensity distribution and at the second lateral position the second intensity distribution with a plurality of wavelengths of the illumination light beam. The focal length of the optical element can be changed, for example, such that the illumination light beam is focused at the first focal point and, for example, subsequently at the second focal point.

The optical sensor has at least one evaluation unit which is configured to determine at least one distance coordinate and/or at least one lateral coordinate of the measurement object, in particular an edge position and/or a profile or a height coordinate, from the first intensity distribution and the second intensity distribution for the first focal point and the first intensity distribution and the second intensity distribution for the second focal point. "Lateral coordinate" in the context of the present invention is a coordinate perpendicular to the z-axis, for example, an x-coordinate and/or y-coordinate. In this case, "an evaluation unit" can generally be understood to mean an electronic device configured to evaluate signals generated by the sensor element. By way of example, one or more electronic connections between the sensor element and the evaluation unit can be provided for this purpose. The evaluation unit can comprise, for example, at least one data processing device, such as at least one computer or microcontroller. The data processing device can have one or more volatile and/or non-volatile data memories, wherein the data processing device can be configured for example in terms of programming to drive the sensor element. The evaluation unit can furthermore comprise at least one interface, for example an electronic interface and/or a human-machine interface, for example, an input/output device such as a display and/or a keyboard. The evaluation unit can be constructed, for example, centrally or else in a decentralized manner. Other configurations are also conceivable.

The evaluation unit can be configured to determine information relating to a lateral gradient of the intensity distribution and to determine, from the information relating to the lateral gradient, the distance coordinate and/or the lateral coordinate of the measurement object. "Lateral gradient" in the context of the present invention is a measure of a change in the intensity distribution along the x-axis.

The sensor element can be configured to measure and/or determine a distribution of the intensity of the detection light beam for at least two focal points in each case for at least two different relative lateral positions. The apparatus for varying the relative lateral position can be configured to move the optical sensor in the x-direction such that the optical axis moves over the at least one edge of the measurement object. The optical sensor can be configured to set the first focal point and one of the relative lateral positions, for example, the first relative lateral position, such that the at least one edge of the measurement object overshadows the optical axis and the at least one edge of the measurement object is arranged in the first focal point. In particular, the edge of the measurement object and the optical axis can have a substantially identical x-coordinate, with deviations in the x-coordinate of 1 to 10 μm being possible. A sharp light spot can form on the confocal stop element if the edge of the measurement object is located in the focal point. The light spot can illuminate the sensor element with maximum intensity such that the sensor element detects an intensity maximum in the first intensity distribution. The optical sensor can be configured to set the second relative lateral position such that the edge of the measurement object and the optical axis have an offset in the x-direction. In particular, the edge of the measurement object and the optical axis can have an offset. The offset can be greater than the optical resolution of 0.6 λ/NA due to the numerical aperture (NA). The offset can be more than 10 µm, for example. The second intensity distribution determined in this arrangement can have an abrupt drop in intensity as compared to the first intensity distribution, in particular have no intensity maximum and/or a flatter distribution. The evaluation unit can be configured to determine for the first focal point a first gradient $dI(x, f_1)/dx$ of the first and second intensity distribution, wherein $f_1$ is the first focal point.

The optical sensor can be configured to set, for the first relative lateral position, the second focal point such that the at least one edge of the measurement object overshadows the optical axis and the at least one edge of the measurement object is not arranged in the second focal point, with the result that the illumination light beam is defocused at the z-coordinate of the edge. The light spot generated in this arrangement on the sensor element can have an intensity distribution that deviates from the first intensity distribution, in particular, have no intensity maximum and/or a flatter distribution. The optical sensor can be configured to set, for the second focal point, the second relative lateral position such that the edge of the measurement object and the optical axis have an offset in the x-direction. The second intensity distribution determined in this arrangement can have, for the second focal point, a slow and/or slight drop in intensity as compared to the first intensity distribution for the second focal point, in particular, it can have a flatter distribution. The evaluation unit can be configured to determine for the second focal point a second gradient $dI(x, f_2)/dx$ of the first and second intensity distribution, wherein $f_2$ is the second focal point.

The evaluation unit can be configured to compare the first gradient $dI(x, f_1)/dx$ and the second gradient $dI(x, f_2)/dx$ and to determine an edge position, in particular the x-coordinate of the edge. If, for a lateral position, the edge of the measurement object is located in a focal point, the gradient can have an abrupt drop in reflected intensity at the edge. If the edge of the measurement object is not located in the focal point, but the light is defocused, the gradient can have a slower transition from light to dark at the edge. The evaluation unit can be configured to detect the abrupt drop. The evaluation unit can be configured to determine, by comparing the first and the second gradient, the gradient that has an abrupt drop, in particular as compared to the other gradient. The evaluation unit can have suitable software, in particular evaluation software and/or analysis software. The evaluation unit can be configured to assign a focal point to the determined gradient. The evaluation unit can be configured to determine a distance coordinate of the measurement object from the assigned focal point. The lateral coordinate x of the edge can be determined by ascertaining the x-coordinate at which the determined gradient has a maximum change. After the edge position has been determined, the z-position to the edge can be correctly determined. Beyond the edge, strong artefacts having apparent excesses are formed.

The optical sensor can be a chromatically confocal sensor. The sensor element can be configured to determine at least one spectral distribution. A determination of a spectral distribution can be understood to mean a measurement and/or determination of the intensity of the detection light beam as a function of the wavelength. The optical sensor can be configured to determine for at least two relative lateral positions in each case one spectral distribution. The evaluation unit can be configured to determine at least one gradient $I(x, \lambda)$ of the intensity distribution for at least two wavelengths, in particular a multiplicity of wavelengths. The evaluation unit can be configured to determine a gradient that has the above-described abrupt drop and assign it to a wavelength. The evaluation unit can be configured to determine the distance coordinate of the measurement object from the assigned wavelength. The lateral coordinate x of the edge can be determined by ascertaining the x-coordinate at which the determined gradient has a maximum change. An evaluation of the intensity profile of all measured colors can permit determination of the edge orientation with an accuracy in the region of an associated point spread function (PSF).

The optical sensor can have an imaging apparatus which is configured to record at least one chromatically confocal image. The evaluation unit can be configured to store the chromatically confocal image. The evaluation unit can be configured to determine at least one spectral distribution from the chromatically confocal image. The optical sensor can be configured to record for at least two relative lateral positions at least one chromatically confocal image. The evaluation unit can be configured to determine for the at least two relative lateral positions in each case at least one spectral distribution from the chromatically confocal image and to determine from a gradient of the spectral distribution the distance coordinate and/or the lateral coordinate of the measurement object.

In a further aspect, in the context of the present invention, a method for determining at least one coordinate of at least one measurement object is provided. The method comprises the following method steps:

generating at least one illumination light beam by at least one illumination apparatus;

illuminating the measurement object with the illumination light beam through at least one first stop element;

setting at least one first focal point and at least one second focal point along an optical axis of at least one optical element;

setting at least one first relative lateral position and at least one second relative lateral position by way of at least one apparatus for varying a relative lateral position;

determining for each of the first focal point and the second focal point at least one first intensity distribution at the first relative lateral position and at least one second intensity distribution at the second relative lateral position by at least one sensor element;

determining at least one distance coordinate and/or at least one lateral coordinate of the measurement object from the first intensity distribution and the second intensity distribution for the first focal point and the first intensity distribution and the second intensity distribution for the second focal point by at least one evaluation unit.

In this case, the method steps can be carried out in the order specified, wherein one or more of the steps can at least partly also be carried out simultaneously and wherein one or more of the steps can be multiply repeated. Furthermore, further steps can additionally be performed independently of whether they are mentioned in the present application.

An optical sensor according to an aspect of the invention can be used in the method. For details with regard to the method according to the aspect of the invention, reference is made to the description of the optical sensor.

The optical sensor according to an aspect of the invention and the method according to an aspect of the invention are advantageous by comparison with known methods and apparatuses. The determination of the first intensity distribution and the second intensity distribution for the first focal point and the first intensity distribution and the second intensity distribution for the second focal point can permit edge localization with a high degree of accuracy despite longitudinal chromatic aberration.

In summary, in the context of the present invention, the following exemplary embodiments are particularly preferred:

Exemplary Embodiment 1: Optical sensor for determining at least one coordinate of at least one measurement object, comprising
- at least one first stop element and at least one illumination apparatus which is configured to generate at least one illumination light beam and to illuminate the measurement object through the first stop element;
- at least one sensor element which is configured to detect at least one portion of at least one detection light beam emanating from the measurement object and to determine at least one intensity distribution;
- at least one optical element which is configured to focus at least one portion of the illumination light beam at least at one focal point along an optical axis of the optical element, wherein the optical sensor is configured to set at least one first focal point and at least one second focal point along the optical axis;
- at least one apparatus for varying a relative lateral position, which is configured to set at least one relative lateral position of the optical axis to the measurement object; wherein the optical sensor is configured to determine, for the first focal point and the second focal point, in each case at least one first intensity distribution at at least one first relative lateral position and at least one second intensity distribution at at least one second relative lateral position, wherein the optical sensor furthermore has at least one evaluation unit which is configured to determine from the first intensity distribution and the second intensity distribution for the first focal point and the first intensity distribution and the second intensity distribution for the second focal point at least one distance coordinate and/or at least one lateral coordinate of the measurement object.

Exemplary Embodiment 2: Optical sensor according to the preceding exemplary embodiment, wherein the evaluation unit is configured to determine information relating to a lateral gradient of the intensity distribution and to determine, from the information relating to the lateral gradient, the distance coordinate and/or the lateral coordinate of the measurement object.

Exemplary Embodiment 3: Optical sensor according to one of the preceding exemplary embodiments, wherein the optical sensor is configured to determine the at least one intensity distribution at a multiplicity of relative lateral positions.

Exemplary Embodiment 4: Optical sensor according to the preceding exemplary embodiment, wherein the optical sensor is configured to determine the at least one intensity distribution at neighboring relative lateral positions.

Exemplary Embodiment 5: Optical sensor according to one of the preceding exemplary embodiments, wherein the optical element has chromatically aberrative properties.

Exemplary Embodiment 6: Optical sensor according to the preceding exemplary embodiment, wherein the optical element is configured to focus the at least one portion of the illumination light beam at at least two different focal points along the optical axis of the optical element.

Exemplary Embodiment 7: Optical sensor according to the preceding exemplary embodiment, wherein the optical sensor is selected from the group consisting of a confocal sensor and a chromatically confocal sensor.

Exemplary Embodiment 8: Optical sensor according to one of the two preceding exemplary embodiments, wherein the sensor element is configured to determine at least one spectral distribution, wherein the optical sensor is configured to determine, for at least two relative lateral positions, in each case one spectral distribution.

Exemplary Embodiment 9: Optical sensor according to one of the three preceding exemplary embodiments, wherein the optical sensor has an imaging apparatus which is configured to record at least one chromatically confocal image, wherein the evaluation unit is configured to determine at least one spectral distribution from the chromatically confocal image.

Exemplary Embodiment 10: Optical sensor according to one of the preceding exemplary embodiments, wherein the apparatus for varying a relative lateral position has at least one displacement device which is configured to set a lateral position of the measurement object and/or a lateral position of the optical sensor.

Exemplary Embodiment 11: Optical sensor according to one of the preceding exemplary embodiments, wherein the apparatus for varying a relative lateral position has at least one beam deflection apparatus, which is configured to deflect the illumination light beam from the optical axis.

Exemplary Embodiment 12: Optical sensor according to the preceding exemplary embodiment, wherein the beam deflection apparatus has an apparatus selected from the group consisting of at least one deflection mirror, at least one MEMS mirror, at least one decentralizable lens element, and at least one rotating prism.

Exemplary Embodiment 13: Optical sensor according to one of the preceding exemplary embodiments, wherein the illumination apparatus has at least one light source selected from the group consisting of at least one monochromatic light source, at least one polychromatic light source, at least one white light source, and at least one broadband light source.

Exemplary Embodiment 14: Optical sensor according to one of the preceding exemplary embodiments, wherein the optical sensor has at least one confocal stop element which is configured to let the at least one portion of the detection light beam through to the sensor element.

Exemplary Embodiment 15: Optical sensor according to the preceding exemplary embodiment, wherein the first stop element and the confocal stop element in each case have at least one hole element.

Exemplary Embodiment 16: Optical sensor according to the preceding exemplary embodiment, wherein the hole element of the first stop element and the hole element of the confocal stop element have different sizes.

Exemplary Embodiment 17: Optical sensor according to one of the preceding exemplary embodiments, wherein the optical sensor has at least one multispot sensor.

Exemplary Embodiment 18: Method for determining at least one coordinate of at least one measurement object, comprising the following method steps:
- generating at least one illumination light beam by way of at least one illumination apparatus;

illuminating the measurement object with the illumination light beam through at least one first stop element;

setting at least one first focal point and at least one second focal point along at least one optical axis of at least one optical element which is configured to focus at least one portion of the illumination light beam at at least one focal point along the optical axis of the optical element;

setting at least one first relative lateral position and at least one second relative lateral position by way of at least one apparatus for varying a relative lateral position which is configured to set at least one relative lateral position of the optical axis to the measurement object;

determining, for the first focal point and the second focal point, in each case at least one first intensity distribution at the first relative lateral position and at least one second intensity distribution at the second relative lateral position by way of at least one sensor element which is configured to detect at least one portion of at least one detection light beam emanating from the measurement object and to determine at least one intensity distribution; and determining at least one distance coordinate and/or at least one lateral coordinate of the measurement object from the first intensity distribution and the second intensity distribution for the first focal point and the first intensity distribution and the second intensity distribution for the second focal point by way of at least one evaluation unit.

Exemplary Embodiment 19: Method according to the preceding exemplary embodiment, wherein an optical sensor according to one of the preceding exemplary embodiments relating to an optical sensor is used.

BRIEF DESCRIPTION OF THE DRAWINGS

The invention will now be described with reference to the drawings wherein.

DESCRIPTION OF EXEMPLARY EMBODIMENTS

Figure 1A:
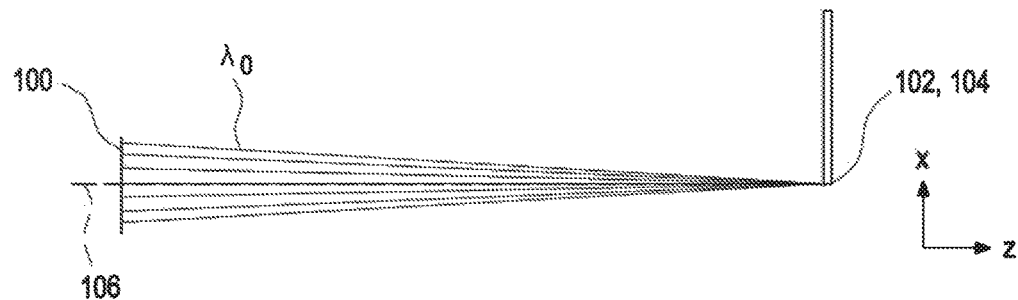
FIGS. 1A and 1B show schematic illustrations of a beam profile for two different wavelengths with longitudinal chromatic aberration.

Further details and features of the invention will become apparent from the following description of exemplary embodiments. The respective features can be realized by themselves or as a plurality in combination with one another. The invention is not restricted to the exemplary embodiments. The exemplary embodiments are illustrated schematically in the figures. Identical reference numerals in the individual figures designate identical or functionally identical elements or elements corresponding to one another with regard to their functions.

Figure 1B:
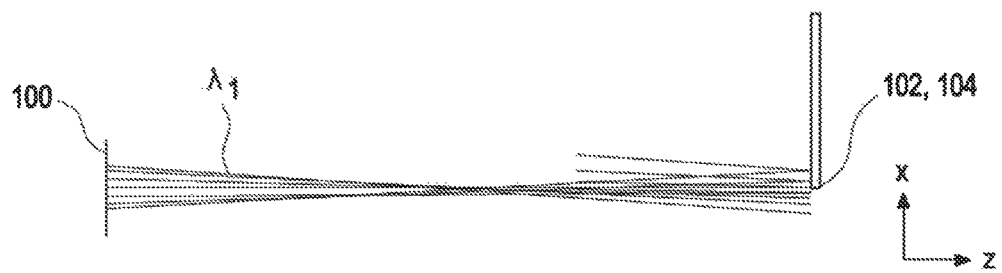

FIGS. 1A and 1B show schematic illustrations of a beam profile for two different wavelengths with longitudinal chromatic aberration in a confocally chromatic sensor. Confocally chromatic sensors typically have a lens element and/or a lens 100 having chromatic aberration, by way of which a longitudinal chromatic aberration is introduced. FIG. 1A shows a beam profile from the lens element 100 to an edge 102 of a measurement object 104 for a wavelength $\lambda_0$. The lens element 100 can have an optical axis 106. In FIG. 1A, the edge 102 overshadows the optical axis 106, in particular the edge 102 and the optical axis 106 have a substantially identical x-coordinate. The lens element 100 can focus light having the wavelength $\lambda_0$ onto the edge 102. The edge 102 can reflect and/or scatter the light, with the result that it is detected by a sensor element (not illustrated in FIGS. 1A and B). FIG. 1B shows a beam profile from the lens element 100 to the edge 102 for a wavelength $\lambda_1$ that differs from the wavelength $\lambda_0$. In FIG. 1B, the edge 102 and the optical axis 106 have an offset in the x-direction. The lens element 100 can focus light having the wavelength $\lambda_1$ at a focal point along the optical axis that differs from a z-coordinate of the edge 102, with the result that said light is defocused at the z-coordinate of the edge 102. Owing to the longitudinal chromatic aberration, light can be reflected and/or scattered by the edge 102 and detected by the sensor even if the edge 102 is not located on the optical axis 106. In known confocally chromatic sensors, it is thus possible to determine a distance coordinate that deviates from an actual distance coordinate for this defocused wavelength $\lambda_1$.

Figure 2:
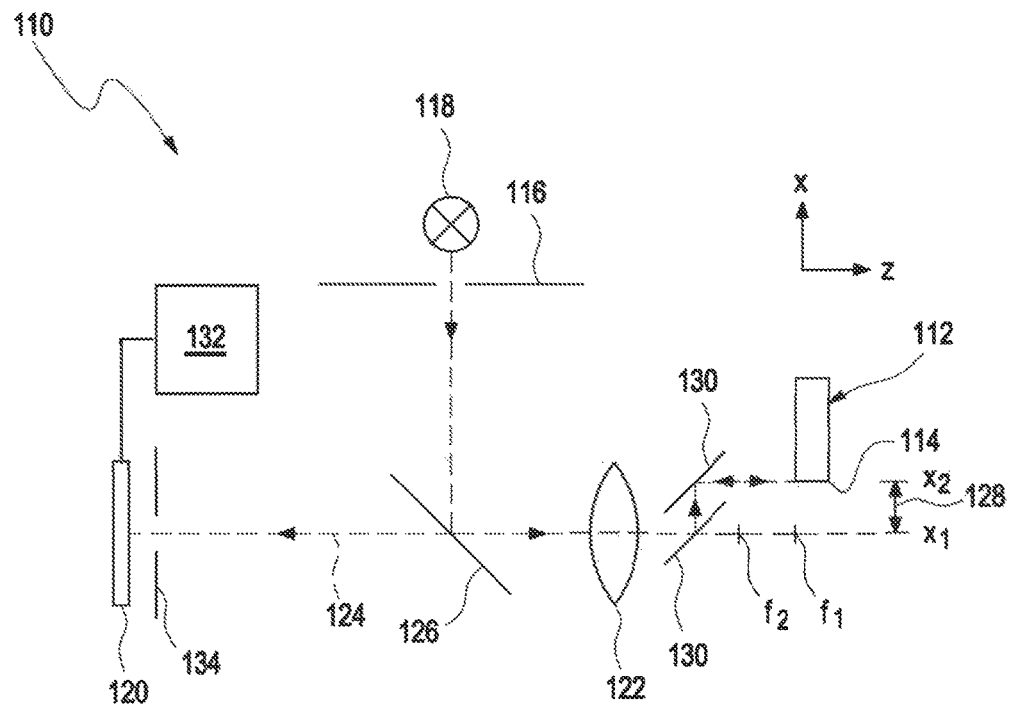
FIG. 2 shows a schematic illustration of an exemplary embodiment of an optical sensor according to the invention.

FIG. 2 shows a schematic illustration of an exemplary embodiment of an optical sensor 110 for determining at least one coordinate of at least one measurement object 112, in particular of an edge 114. The measurement object 112 can be a three-dimensional measurement object, for example at least one turbine blade, at least one vehicle body sheet, at least one seal, or at least one printed circuit board.

The optical sensor 110 comprises at least one first stop element 116 and at least one illumination apparatus 118. The illumination apparatus 118 is configured to generate at least one illumination light beam and to illuminate the measurement object 112 through the first stop element 116. The first stop element 116 can be arranged in front of the illumination apparatus 118. The illumination apparatus 118 can have at least one light source. The illumination apparatus can have at least one light source selected from the group consisting of at least one monochromatic light source, at least one polychromatic light source, at least one white light source, and at least one broadband light source. The light source can have a wide and uniformly distributed spectral density. The illumination apparatus can furthermore have at least one further optical element, in particular a lens element, which is configured to focus the light beam generated by the light source.

The optical sensor 110 comprises at least one sensor element 120 which is configured to detect at least one portion of at least one detection light beam emanating from the measurement object 112 and to determine at least one intensity distribution. The sensor element 120 can be a spectrally resolving detector and/or comprise a spectrally resolving detector. In particular, the sensor element 120 can be or comprise a spectrometer.

The optical sensor 110 comprises at least one optical element 122 which is configured to focus at least one portion of the illumination light beam at at least one focal point along an optical axis 124 of the optical element 122. The optical element 122 can comprise a lens element and/or a compound lens. The optical element can be an optical element 122 having chromatic aberration. The optical sensor 110 can have at least one transfer apparatus 126. The transfer apparatus 126 can be configured as part of the optical element 122 or as a separate element. The transfer apparatus 126 can be configured to guide and/or to direct light generated by the illumination apparatus 118 onto the measurement object 112. The transfer apparatus 126 can be selected from the group consisting of at least one beam splitter, at least one lens element, and at least one compound lens.

The optical sensor 110 is configured to set the at least one first focal point $f_1$ and the at least one second focal point $f_2$, in particular a z-coordinate of the focal point, along the optical axis 124. For example, the optical element 122 can be a lens element having a settable and/or adjustable focal length, and the focal points can be set by setting the focal length. For example, the focal points can be set by way of displacing, for example manually or automatically, the optical element 122 along the z-axis. For example, when using a monochromatic light source, the illumination light beam can be focused in a first focal plane and, in particular subsequently, one or both of the focal length of the lens element or an arrangement of the optical element 122 can be changed such that the illumination light beam is focused in a second focal plane. The optical element 122 can, for example, be an optical element having chromatic aberration. The optical element 122 can be configured to focus a multiplicity of portions of the illumination light beam depending on the wavelength at a multiplicity of different focal planes along the optical axis 124. The optical sensor 110 can be configured to focus portions of an illumination light beam having different wavelengths in focal planes along the optical axis 124. For example, a first portion of the illumination light beam having a first wavelength can be focused in a focal point $f_1$, and a second portion of the illumination light beam having a second wavelength, which differs from the first wavelength, can be focused in a focal point $f_2$.

The optical sensor 110 comprises at least one apparatus for varying a relative lateral position 128, which is symbolically illustrated in FIG. 2. The apparatus for varying a relative lateral position 128 is configured to set at least one relative lateral position of the optical axis 124 to the measurement object 112. A "lateral position" is a position in the focal plane, in particular along the x-axis. A "relative lateral position" is a relative lateral position of the measurement object to the optical sensor, in particular to the optical axis. Setting can be performed manually and/or automatically, for example using at least one motor. The apparatus for varying a relative lateral position 128 can have at least one displacement device (not illustrated in FIG. 2) which is configured to set a lateral position of the measurement object 112 and/or a lateral position of the optical sensor 110, in particular of the optical element 122. The displacement device can have, for example, at least one measurement table on which the measurement object 112 can be arranged and which is configured to change the lateral position of the measurement object 112. The measurement object 112 can be arranged, for example, on the measurement table at a working height and can be moved, in particular lifted or lowered, via a lifting apparatus in the focal plane, in particular along the x-axis. The measurement table can be configured to move the measurement object 112 in the x-, y-, and z-direction and to set a three-dimensional position of the measurement object. Alternatively, or additionally, the displacement device can be configured to move the optical sensor 110 in the x-, y-, and z-direction, i.e., along the x-, y-, and z-axes, and to set a three-dimensional position of the measurement object 112. The displacement device can have at least one movable holder that is configured to position the optical sensor 110. The movable holder can have at least one guide and/or a joint which are configured to move the optical sensor 110 in the x-, y-, and z-direction. The displacement device can have a movable portal. The displacement device can have at least one movable arm, for example an articulated arm. Alternatively, or additionally, the apparatus for varying a relative lateral position can have at least one beam deflection apparatus 130, which is configured to deflect the illumination light beam from the optical axis 124. The beam deflection apparatus 130 can have an apparatus selected from the group consisting of at least one deflection mirror, at least one MEMS mirror, at least one decentralizable lens element, and at least one rotating prism.

The apparatus for varying the relative lateral position 128 can be configured to set the relative lateral position continuously or non-continuously, in particular incrementally. For example, the apparatus for varying the relative lateral position 128 can be configured to continuously change the measurement object 112 and/or the optical sensor 110. The apparatus for varying the relative lateral position 128 can be configured to set at least one first relative lateral position $x_1$ and at least one second relative lateral position $x_2$. The first and second relative lateral positions can be neighboring relative lateral positions. The first and the second relative lateral position can be arranged such that a gradient of the intensity can be determined. The apparatus for varying the relative lateral position 128 can be configured to set a multiplicity of relative lateral positions, for example, an array of relative lateral positions. The apparatus for varying the relative lateral position 128 can be configured to set at least two relative lateral positions successively or at the same time. The optical sensor 110 can be configured to determine the at least one intensity distribution at a multiplicity of relative lateral positions, in particular at each of the relative lateral positions of the array of relative lateral positions. The optical sensor 110 can be configured to determine in each case an intensity distribution at neighboring relative lateral positions. By way of example, determination of the intensity distributions at the relative lateral positions of the array can be performed in parallel fashion and/or at the same time. The optical sensor 110 can have at least one multispot sensor.

The optical sensor 110 is configured to determine, for the at least one first focal point $f_1$ and at least one second focal point $f_2$, in each case at least one first intensity distribution at the at least one first relative lateral position $x_1$ and at least one second intensity distribution at the at least one second relative lateral position $x_2$. The focal points can be mutually different focal points. For example, the optical element 122 can be a lens element with chromatic aberration, and it is possible to determine at the first relative lateral position $x_1$ the first intensity distribution and at the second lateral position $x_2$ the second intensity distribution having a first wavelength, for example the wavelength $\lambda_0$, of the illumination light beam and a second wavelength, for example wavelength $\lambda_1$, of the illumination light beam. It is possible for example to determine at the first relative lateral position $x_1$ the first intensity distribution and at the second lateral position $x_2$ the second intensity distribution with a multiplicity of wavelengths of the illumination light beam. The focal length of the optical element 122 can be changed, for example, such that the illumination light beam is focused at the first focal point $f_1$ and, for example subsequently, at the second focal point $f_2$.

The optical sensor 110 has at least one evaluation unit 132 which is configured to determine at least one distance coordinate and/or at least one lateral coordinate of the measurement object 112, in particular an edge position and/or a profile or a height coordinate, from the first intensity distribution and the second intensity distribution for the first focal point $f_1$ and the first intensity distribution and the second intensity distribution for the second focal point $f_2$. By way of example, one or more electronic connections between the sensor element 120 and the evaluation unit 132 can be provided. The evaluation unit 132 can comprise, for example, at least one data processing apparatus, such as at least one computer or microcontroller. The data processing apparatus can have one or more volatile and/or non-volatile data memories, wherein the data processing apparatus can be configured for example in terms of programming to drive the sensor element. The evaluation unit 132 can furthermore comprise at least one interface, for example an electronic interface and/or a human-machine interface such as, for example, an input/output apparatus such as a display and/or a keyboard. The evaluation unit 132 can be constructed, for example, centrally or in a decentralized manner. Other configurations are also conceivable.

The evaluation unit 132 can be configured to determine information relating to a lateral gradient of the intensity distribution and to determine, from the information relating to the lateral gradient, the distance coordinate and/or the lateral coordinate of the measurement object 112.

The sensor element 120 can be configured to measure and/or determine a distribution of the intensity of the detection light beam for at least two focal points in each case for at least two different relative lateral positions. The apparatus for varying the relative lateral position 128 can be configured to move the optical sensor 110 in the x-direction such that the optical axis 124 moves over the at least one edge 114 of the measurement object 112. The optical sensor 110 can be configured to set the first focal point $f_1$ and one of the relative lateral positions, for example the first relative lateral position $x_1$, such that the edge 114 overshadows the optical axis 124 and the edge 114 is arranged in the first focal point $f_1$. In particular, the edge 114 and the optical axis 124 can have a substantially identical x-coordinate. The optical sensor 110 can have at least one confocal stop element 134 which is configured to permit passage of the at least one portion of the detection light beam to the sensor element 120. A sharp light spot can form on the confocal stop element 134 if the edge 114 is located in the focal point $f_1$. The light spot can illuminate the sensor element 120 with maximum intensity such that the sensor element 120 detects an intensity maximum in the first intensity distribution. The optical sensor 110 can be configured to set the second relative lateral position $x_2$ such that the edge 114 and the optical axis 124 have an offset in the x-direction. The second intensity distribution determined in this arrangement can have an abrupt drop in intensity as compared to the first intensity distribution, in particular it can have no intensity maximum and/or a flatter distribution. The evaluation unit 132 can be configured to determine for the first focal point $f_1$ a first gradient $dI(x, f_1)/dx$ of the first and second intensity distribution.

The optical sensor 110 can be configured to set, for the first relative lateral position $x_1$, the second focal point $f_2$ such that the edge 114 overshadows the optical axis 124 and the edge 114 is not arranged in the second focal point $f_2$, with the result that the illumination light beam is defocused at the z-coordinate of the edge 114. The light spot generated in this arrangement can on the sensor element 120 have an intensity distribution that deviates from the first intensity distribution, in particular have no intensity maximum and/or a flatter distribution. The optical sensor 110 can be configured to set, for the second focal point $f_2$, the second relative lateral position $x_2$ such that the edge 114 and the optical axis 124 have an offset in the x-direction. The second intensity distribution determined in this arrangement for the second focal point $f_2$ can have a slow and/or slight drop in intensity as compared to the first intensity distribution for the second focal point $f_2$, in particular have a flatter distribution. The evaluation unit 132 can be configured to determine for the second focal point $f_2$ a second gradient $dI(x, f_2)/dx$ of the first and second intensity distribution.

The evaluation unit 132 can be configured to compare the first gradient $dI(x, f_1)/dx$ and the second gradient $dI(x, f_2)/dx$ and to determine an edge position, in particular the x-coordinate of the edge 114. If, for a lateral position, the edge 114 is located in a focal point, the gradient can have an abrupt drop in reflected intensity at the edge 114. If the edge 114 of the measurement object is not located in the focal point, but the light is defocused, the gradient can have a slower transition from light to dark at the edge 114. The evaluation unit 132 can be configured to detect the abrupt drop. The evaluation unit 132 can be configured to determine, by comparing the first and the second gradient, the gradient that has an abrupt drop, in particular as compared to the other gradient. The evaluation unit 132 can have suitable software, in particular evaluation software and/or analysis software. The evaluation unit 132 can be configured to assign a focal point to the determined gradient. The evaluation unit 132 can be configured to determine the distance coordinate of the measurement object 112 from the assigned focal point. The lateral coordinate x of the edge can be determined by ascertaining the x-coordinate at which the determined gradient has a maximum change.

The optical sensor 110 can be a chromatically confocal sensor. The sensor element 120 can be configured to determine at least one spectral distribution. The optical sensor 110 can be configured to determine for at least two relative lateral positions in each case one spectral distribution. The evaluation unit 132 can be configured to determine at least one gradient $I(x, \lambda)$ of the intensity distribution for at least two wavelengths, in particular a plurality of wavelengths. The evaluation unit 132 can be configured to determine a gradient that has the above-described abrupt drop and assign it to a wavelength. The evaluation unit 132 can be configured to determine a distance coordinate of the measurement object from the assigned wavelength. The lateral coordinate x of the edge can be determined by ascertaining the x-coordinate at which the determined gradient has a maximum change. An evaluation of the intensity profile of all measured colours can permit determination of the edge orientation with an accuracy in the region of an associated point spread function (PSF).

It is understood that the foregoing description is that of the exemplary embodiments of the invention and that various changes and modifications may be made thereto without departing from the spirit and scope of the invention as defined in the appended claims.

LIST OF REFERENCE NUMERALS

100 Lens element
102 Edge
104 Measurement object
106 Optical axis
110 Optical sensor
112 Measurement object
114 Edge
116 First stop element
118 Illumination apparatus
120 Sensor element
122 Optical element
124 Optical axis
126 Transfer apparatus r
128 Relative lateral position 130 Beam deflection apparatus
132 Evaluation unit
134 Confocal stop element

What is claimed is:

1. An optical sensor for determining at least one coordinate of at least one measurement object, the optical sensor comprising:
   at least one first stop element;
   at least one light source configured to generate at least one illumination light beam and to illuminate the at least one measurement object through the first stop element;
   at least one sensor element configured to detect at least one portion of at least one detection light beam emanating from the at least one measurement object and to determine an intensity distribution;
   at least one optical element configured to:
      focus at least one portion of the illumination light beam at at least one focal point along an optical axis of the at least one optical element, and
      set at least one first focal point and at least one second focal point along the optical axis;
   a displacement device configured to:
      vary a relative lateral position of the at least one measurement object relative to the optical axis along a lateral axis perpendicular to the optical axis, and
      set at least one first relative lateral position and at least one second relative lateral position;
   wherein the optical sensor is configured to detect for each of the first focal point and the second focal point, at least one first intensity distribution at the at least one first relative lateral position and at least one second intensity distribution at the at least one second relative lateral position,
   wherein the optical sensor includes at least one evaluation unit configured to determine from a first lateral gradient of the at least one first intensity distribution and the at least one second light intensity distribution at the first focal point and from a second lateral gradient of the first light intensity distribution and the second intensity distribution at the second focal point at least one distance coordinate and/or at least one lateral coordinate of the measurement object, and
   wherein the first lateral gradient is a measure of a change in the intensity distribution along the lateral axis at the first focal point and the second lateral gradient is a measure of a change in the intensity distribution along the lateral axis at the second focal point.

2. The optical sensor of claim 1, wherein the optical sensor is configured to determine the intensity distribution at a plurality of relative lateral positions.

3. The optical sensor of claim 1, wherein the at least one optical element has chromatically aberrative properties.

4. The optical sensor of claim 1, wherein the at least one optical sensor is selected from the group consisting of a confocal sensor and a chromatically confocal sensor.

5. The optical sensor of claim 1, wherein:
   the at least one sensor element is configured to determine at least one spectral distribution, and
   the optical sensor is configured to determine one spectral distribution for each of at least two relative lateral positions.

6. The optical sensor of claim 1, wherein:
   the optical sensor includes an imaging device configured to record at least one chromatically confocal image, and
   the evaluation unit is configured to determine at least one spectral distribution from the chromatically confocal image.

7. The optical sensor of claim 1, wherein the displacement device is configured to set a lateral position of the measurement object and/or a lateral position of the optical sensor.

8. The optical sensor of claim 1, wherein the displacement device includes at least one beam deflection device configured to deflect the illumination light beam from the optical axis.

9. The optical sensor of claim 1, wherein the beam deflection device is selected from the group consisting of at least one deflection mirror, at least one micro-electro-mechanical systems (MEMS) mirror, at least one decentralizable lens element, and at least one rotating prism.

10. The optical sensor of claim 1, wherein the light source is selected from the group consisting of at least one monochromatic light source, at least one polychromatic light source, at least one white light source, and at least one broadband light source.

11. The optical sensor of claim 1, further comprising at least one confocal stop element configured to let the at least one portion of the detection light beam through to the at least one sensor element.

12. The optical sensor of claim 11, wherein:
   each of the at least one first stop element and the at least one confocal stop element includes at least one hole element, and
   the at least one hole element of the at least one first stop element and the hole element of the at least one confocal stop element have different sizes.

13. A method for determining at least one coordinate of at least one measurement object, the method comprising:
   generating at least one illumination light beam by at least one illumination device;
   illuminating the at least one measurement object with the illumination light beam through at least one first stop element;
   setting at least one first focal point and at least one second focal point along an optical axis of at least one optical element;
   setting at least one first relative lateral position and at least one second relative lateral position by a displacement device configured to vary a relative lateral position;
   detecting for each of the first focal point and the second focal point at least one first intensity distribution at the first relative lateral position and at least one second intensity distribution at the second relative lateral position by at least one sensor element; and
   determining at least one distance coordinate and/or at least one lateral coordinate of the measurement object from a first lateral gradient of the first intensity distribution and the second intensity distribution for the first focal point and a second lateral gradient of the first intensity distribution and the second intensity distribution for the second focal point by at least one evaluation unit.

14. The method of claim 13, further comprising:
   determining the at least one coordinate of the at least one measurement object with an optical sensor, the optical sensor comprising:
   at least one first stop element;
   the at least one illumination device being configured to generate the at least one illumination light beam and to illuminate the at least one measurement object through the first stop element;
   the at least one sensor element being configured to detect at least one portion of at least one detection light beam emanating from the at least one measurement object and to determine an intensity distribution;

at least one optical element configured to:
  focus the at least one portion of the illumination light beam at at least one focal point along the optical axis of the optical element, and
  set the at least one first focal point and the at least one second focal point along the optical axis;
a displacement device configured to:
  vary a relative lateral position of the at least one measurement object relative to the optical axis along a lateral axis perpendicular to the optical axis, and
  set the relative lateral position;
the optical sensor being configured to detect, at the first focal point and the second focal point, the at least one first intensity distribution at the at least one first relative lateral position and the at least one second intensity distribution at the at least one second relative lateral position, and
the optical sensor including the at least one evaluation unit being configured to determine from the first intensity distribution and the second intensity distribution for the first focal point and the first intensity distribution and the second intensity distribution for the second focal point the at least one distance coordinate and/or the at least one lateral coordinate of the measurement object.

* * * * *